United States Patent [19]
Druin et al.

[11] 3,920,785
[45] Nov. 18, 1975

[54] PROCESS FOR INCREASING THE POROSITY OF OPENCELLED MICROPOROUS FILM

[75] Inventors: Melvin L. Druin, West Orange; John T. Loft, Springfield; Steven G. Plovan, Livingston, all of N.J.

[73] Assignee: Celanese Corporation, New York, N.Y.

[22] Filed: June 4, 1970

[21] Appl. No.: 43,608

Related U.S. Application Data

[63] Continuation-in-part of Ser. No. 876,511, Nov. 13, 1969, abandoned.

[52] U.S. Cl............ 264/210 R; 264/41; 264/210 R; 264/288; 264/343; 264/DIG. 47
[51] Int. Cl.² ............................................ D01D 5/12
[58] Field of Search.......... 264/176, 41, 210 R, 288, 264/235, 289, 341–344, DIG. 47

[56] References Cited
UNITED STATES PATENTS

| | | | |
|---|---|---|---|
| 2,856,636 | 10/1958 | Schulken et al. | 264/344 |
| 2,948,583 | 8/1960 | Adams et al. | 264/290 T |
| 2,956,308 | 10/1960 | Schulken et al. | 264/344 |
| 2,981,978 | 9/1961 | Griffing | 264/343 X |
| 3,102,323 | 9/1963 | Adams | 260/40 |
| 3,117,173 | 1/1964 | Adams | 264/290 |
| 3,184,369 | 5/1965 | Haseley | 264/78 |
| 3,190,718 | 6/1965 | Schoeneberg et al. | 8/130.1 |
| 3,215,486 | 11/1965 | Hada et al. | 264/210 F |
| 3,233,019 | 2/1966 | Adams | 264/290 |
| 3,234,313 | 2/1966 | Miller et al. | 264/230 |
| 3,323,190 | 6/1967 | Boltiniew | 28/72 |
| 3,330,897 | 7/1967 | Tessier | 264/168 |
| 3,377,415 | 4/1968 | Oppenlander | 264/210 F |
| 3,407,253 | 10/1968 | Yoshimara et al. | 264/289 |
| 3,426,754 | 2/1969 | Bierenbaum et al. | 128/156 |
| 3,432,590 | 3/1969 | Papps | 264/210 F |
| 3,536,796 | 10/1971 | Rock | 264/211 |
| 3,539,676 | 11/1970 | Polestak | 264/342 RE |
| 3,549,743 | 12/1970 | Riordon | 264/210 F |
| 3,551,363 | 12/1970 | Brody | 264/342 |
| 3,558,764 | 1/1971 | Isaacson et al. | 264/210 |

*Primary Examiner*—Jay H. Woo
*Attorney, Agent, or Firm*—Thomas J. Morgan; Linn I. Grim; Marvin Bressler

[57] ABSTRACT

Certain open-celled microporous films are treated to give products having increased porosity. The process involves contacting the open-celled film with a liquid organic compound such as perchloroethylene.

6 Claims, No Drawings

PROCESS FOR INCREASING THE POROSITY OF OPENCELLED MICROPOROUS FILM

CROSS REFERENCE TO RELATED APPLICATION

This application is a continuation-in-part of U.S. application for Letters Patent Ser. No. 876,511, filed Nov. 13, 1969, and now abandoned, which is assigned to the assignee of the present invention.

BACKGROUND OF THE INVENTION

Field of the Invention

The present invention relates to a novel process for increasing the porosity of open-celled microporous films, and to the products produced thereby.

Introduction

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films of the present invention are of the latter type.

Further, the porous films of the present invention are microscopic, i.e., the details of their pore configuration or arrangement are descernible only by microscopic examination. In fact, the open cells or pores in the films are smaller than those which can be measured using an ordinary light microscope, because the wavelength of visible light, which is about 5,000 Angstroms (an Angstrom is one ten-billionth of a meter), is longer than the longest planar or surface dimension of the open cell or pore. The microporous films of the present invention may be identified, however, by using electron microscopy techniques which are capable of resolving details of pore structure below 5,000 Angstroms.

The microporous films of the present invention are also characterized by a reduced bulk density, sometimes hereinafter referred to simply as a "low" density. That is, these microporous films have a bulk or overall density lower than the bulk density of corresponding films composed of identical polymeric material but having no open-celled or other voidy structure. The term "bulk density" as used herein means the weight per unit of gross or geometric volume of the film, where gross or geometric volume of the film, where gross volume is determined by immersing a known weight of the film in a vessel partly filled with mercury at 25°C and atmospheric pressure. The volumetric rise in the level of mercury is a direct measure of the gross volume. This method is known as the mercury volumenometer method, and is described in the *Encyclopedia of Chemical Technology*, Vol. 4, page 892 (Interscience 1949).

Summary of the Prior Art

Heretofore, films have been prepared from synthetic resins or polymers, e.g., polypropylene, by various melt extrusion or casting methods. Such films have many desirable properties such as high strength, and resistance to heat, light, and various chemicals.

For specific applications such as rainwear, tent material, and backings for breathable medical dressings or bandages, however, films having a porous structure in addition to their other properties are necessary or highly desirable.

Porous films have been produced which possess a microporous, open-celled structure, and which are also characterized by a reduced bulk density. Films possessing this microporous structure are described, for example, in U.S. Pat. No. 3,426,754, which patent is assigned to the assignee of the present invention. The preferred method of preparation described therein involves drawing or stretching at ambient temperatures, i.e., "cold drawing", a crystalline, elastic starting film in an amount of about 10 to 300% of its original length, with subsequent stabilization by heat setting of the drawn film under a tension such that the film is not free to shrink or can shrink only to a limited extent.

While the above described open-celled microporous film of the prior art is useful, the search has continued for new processes able to increase the porosity of open-celled microporous films. An increase in porosity can be significant in applications such as breathable rainwear, tent material, and medical dressings where it may be necessary or highly desirable for greater amounts of air or mositure vapor to pass through a given size film in a given amount of time.

SUMMARY OF THE INVENTION

Accordingly, an object of the present invention is to provide novel processes for increasing the porosity of open-celled microporous polymer films.

Another object of the present invention is to provide novel open-celled microporous polymer films having increased porosity.

Other and further objects of the present invention will be apparent to those skilled in the art from the following:

In accordance with the present invention, a process is provided for increasing the porosity of open-celled microporous films. The process comprises contacting the film with at least one liquid organic compound having up to 8 carbon atoms and a boiling point less than 150°C. These liquid organic ocmpounds may be selected from aliphatic and aromatic hydrocarbons, chlorinated aliphatic hydrocarbons, aliphatic ketones, monohydric aliphatic alcohols, and aliphatic ethers.

The term "liquid organic compound" is used herein as meaning those organic compounds which are in the liquid phase or state at 20°C and 760 mm Hg pressure.

The essence of the present invention is the discovery that certain liquid organic compounds impart greater porosity to certain open-celled microporous polymer films which are produced from non-porous, crystalline, elastic polymer films. The process for producing these particular open-celled films includes the steps of (1) cold stretching, i.e., cold drawing, the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat setting the resulting porous film under tension, i.e., at substantially constant length, to impart stability to the film. The elastic film is preferably made from crystalline polymers such as polypropylene by melt extruding the polymer into a film, taking up the extrudate at a drawdown ratio giving an oriented film, and thereafter heating or annealing the oriented film if necessary to improve or enhance the initial crystallinity.

As determined by various morphological techniques or tests such as electron microscopy, these particular open-celled microporous films are characterized by a plurality of elongated, non-porous, inter-connecting surface regions or areas which have their axes of elongation substantially parallel. Substantially alternating with and defined by these non-porous surface regions are a plurality of elongated, porous surface regions which contain a plurality of parallel fibrils or fibrous threads. These fibrils are connected at each of their ends to the non-porous regions, and are substantially perpendicular to them. Between the fibrils are the pores or open cells of the films. These surface pores or open cells are substantially interconnected through tortuous paths or passageways which extend from one surface region to another surface area or region.

With such a defined or organized morphological structure, these films may have a greater proportion of surface area that the pores cover, a greater number of pores, and a more uniform distribution of pores, than other microporous films. Further, the fibrils present in these films are more drawn or oriented with respect to the rest of the polymer material in the film, and thus contribute to the higher thermal stability of the film. As a result of the present invention, the porosity of these films may be increased to even higher levels.

Other aspects and advantages of the present invention will become apparent to one skilled in the art to which the present invention pertains from the following more detailed description of preferred embodiments:

DESCRIPTION OF THE PREFERRED EMBODIMENTS

As stated above, the open-celled microporous films which are treated in accordance with the present invention are formed from a starting non-porous elastic film of crystalline, film-forming, polymers. These elastic films have an elastic recovery at zero recovery time (hereinafter defined) when subjected to a standard strain (extension) of 50 percent at 25°C and 65 percent relative humidity of at least about 40 percent, preferably at least about 50 percent, and most preferably at least about 80 percent.

Elastic recovery as used herein is a measure of the ability of a structure or shaped article such as a film to return to its original size after being stretched, and may be calculated as follows: Elastic Recovery (ER), % = (length when stretched)-(length after stretching) × 100 /length added when stretched
Stated another way, elastic recovery provides a measure of conformance with the Hooke's law portion of a stress-strain curve.

Although a standard strain of 50 percent is used to identify the elastic properties of the starting films, such strain is merely exemplary. In general, such starting films will have elastic recoveries higher at strains less than 50 percent, and somewhat lower at strains substantially higher than 50 percent, as compared to their elastic recovery at a 50 percent strain.

These starting elastic films will also have a percent crystallinity of at least 20 percent, preferably at least 30 percent, and most preferably at least 50 percent, e.g., about 50 to 90 percent, or more. Percent crystallinity is determined by the x-ray method described by R. G. Quynn et al in the *Journal of Applied Polymer Science*, Vol. 2, No. 5, pp. 166–173 (1959). For a detailed discussion of crystallinity and its significance in polymers, see *Polymers and Resins*, Golding (D. Van Nostrand, 1959)

Preferred suitable starting elastic films, as well as the preparation thereof, are further defined in Canadian Pat. No. 855,611, Wissbrun and Bierenbaum, inventors, and assigned to the same assignee as the present invention.

Other elastic films which may be suitable are described in British Patent No. 1,052,550, published Dec. 21, 1966.

The starting elastic film utilized in the preparation of the open-celled microporous films should be differentiated from films formed from classical elastomers such as the natural and synthetic rubbers. With such classical elastomers the stress-strain behavior, and particularly the stress-temperature relationship, is governed by entropy-mechanism of deformation (rubber elasticity). The positive temperature coefficient of the retractive force, i.e., decreasing stress with decreasing temperature and complete loss of elastic properties at the glass transition temperatures, are particularly consequences of entropy-elasticity. The elasticity of the starting elastic films utilized herein, on the other hand, is of a different nature. In qualitative thermodynamic experiments with these elastic starting films, increasing stress with decreasing temperature (negative temperature coefficient) may be interpreted to mean that the elasticity of these materials is not governed by entropy effects but dependent upon an energy term. More significantly, the starting elastic films have been found to retain their stretch properties at temperatures where normal entropy-elasticity could no longer be operative. Thus, the stretch mechanism of the starting elastic films is thought to be based on energy-elasticity relationships, and these elastic films may then be referred to as "non-classical" elastomers.

As stated, the starting elastic films employed in this invention are made from a polymer of a type capable of developing a significant degree of crystallinity, as contrasted with more conventional or "classical" elastic materials such as the natural and synthetic rubbers which are substantially amorphous in their unstretched or tensionless state.

A significant group of polymers, i.e., synthetic resinous materials, to which this invention may be applied are the olefin polymers, e.g., polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1. These polymers in the form of films should generally have a percent crystallinity of at least 20 percent, preferably at least 30 percent, and most preferably about 50 percent to 90 percent, or higher.

For example, a film-forming homopolymer of polypropylene may be employed. When propylene homopolymers are contemplated, it is preferred to employ an isotactic polypropylene having a percent crystallinity as indicated above, a weight average molecular weight ranging from about 100,000 to 750,000, preferably about 200,000 to 500,000, and a melt index (ASTM-1958D-1238-57T, Part 9, page 38) from about 0.1 to about 75, preferably about 0.5 to 30, so as to give a final film product having the requisite physical properties.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer is a "random" oxymethylene copolymer, i.e., one which contains recurring oxymethylene, i.e., —CH$_2$—O—, units interspersed with -OR- groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. These polymers in film form may also have a crystallinity of at least 20 percent, preferably at least 30 percent, and most preferably at least 50 percent, e.g., 50 to 60 percent, or higher. Further, these polymers have a melting point of at least 150°C, and a number average molecular weight of at least 10,000. For a more detailed discussion of acetal and oxymethylene polymers, see, *Formaldehyde*, Walker, pp. 175–191, (Reinhold, 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, all of which are well known in the art and need not be described further herein for sake of brevity.

The types of apparatus suitable for forming the starting elastic films are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw to the die from which it is extruded through a slot in the form of a film from which it is drawn by a take-up or casting roll. More than one take-up roll in various combinations or stages may be used. The die opening or slot width may be in the range, for example, of about 10 to 200 mils.

Using this type of apparatus, film may be extruded at a draw-down ratio of about 20:1 to 200:1, preferably 50:1 to 150:1.

The terms "drawdown ratio" or, more simply, "draw ratio", as used herein is the ratio of the film wind-up or take-up speed to the speed of the film issuing at the extrusion die.

The melt temperature for film extrusion is, in general, no higher than about 100°C above the melting point of the polymer and no lower than about 10°C above the melting point of the polymer.

For example, polypropylene may be extruded at a melt temperature of about 180°C to 270°C, preferably 200°C to 240°C. Polyethylene may be extruded at a melt temperature of about 175° to 225°C while acetal polymers, e.g., those of the type disclosed in U.S. Pat. No. 3,027,352 may be extruded at a melt temperature of about 175°C to 235°C, preferably 185°C to 235°C, and most preferably 195°C to 215°C.

The extrusion operation is preferably carried out with rapid cooling and rapid drawdown in order to obtain maximum elasticity. This may be accomplished by having the take-up roll relatively close to the extrusion slot, e.g., within 2 inches and, preferably, within 1 inch. An "air knife" operating at temperatures between, for example 0°C and 40°C, may be employed within one inch of the slot to quench, i.e., quickly cool and solidify, the film. The take-up roll may be rotated, for example, at a speed of 10 to 1000 ft/min, preferably 50 to 500 ft/min.

While the above description has been directed to slit die extrusion methods, an alternative method of forming the starting elastic films contemplated by this invention is the blown film extrusion method wherein a hopper and an extruder are employed which are substantially the same as in the slot extruder described above. From the extruder, the melt enters a die from which it is extruded through a circular slot to form a tubular film having an initial diameter D$_1$. Air enters the system through an inlet into the interior of said tubular film and has the effect of blowing up the diameter of the tubular film to a diameter D$_2$. Means such as air rings may also be provided for directing the air about the exterior of extruded tubular film so as to provide quick and effective cooling. Means such as a cooling mandrel may be used to cool the interior of the tubular film. After a short distance during which the film is allowed to completely cool and harden, it is wound up on a take-up roll.

Using the blown film method, the drawdown ratio is preferably 20:1 to 200:1, the slot opening 10 to 200 mils, the D$_2$/D$_1$ ratio, for example, 0.5 to 6.0, preferably 0.9 to 3.0, and most preferably about 1.0 to about 2.5, and the take-up speed, for example, 30 to 700 ft/min. The melt temperature may be within the ranges given previously for straight slot extrusion.

The extruded film may then be initially heat treated or annealed in order to improve crystal structure, e.g., by increasing the size of the crystallites and removing imperfections therein. Generally, this annealing is carried out at a temperature in the range of about 5°C to 100°C below the melting point of the polymer for a period of a few seconds to several hours, e.g., 5 seconds to 24 hours, and preferably from about 30 seconds to 2 hours. For polypropylene, the preferred annealing temperature is about 100° to 155°C, while for oxymethylene (acetal) copolymers, the preferred annealing temperature is about 110° to 165°C.

An exemplary method of carrying out the annealing is by placing the extruded film in a tensioned or tensionless state in an oven at the desired temperature in which case the residence time is preferably in the range of about 30 seconds to 1 hour.

Continuous, semi continuous, or batch processes may be used for the production of open-celled microporous film from the elastic starting film. For example, in a continuous process the elastic film may be fed from a supply or feed roll into a cold stretching zone. The cold stretching apparatus may comprise a nip roll cooperating with a first cold stretch roll which may be driven at a peripheral speed S$_1$ by suitable driving means and two other nip rolls which cooperate with a second cold stretch roll which may be driven by a suitable driving means at a peripheral speed $S_2$, which is greater than $S_1$. The elastic film may thereby be cold stretched at a cold stretch ratio of $S_2/S_1$. The cold stretched film may then be fed into an oven which may provide heat for both the hot stretching and the heat setting steps. The hot stretching apparatus may comprise a hot stretch roll driven by suitable means at a peripheral speed $S_3$, which is about the same or slightly greater, e.g., less 10 percent greater, than $S_2$, to prevent relaxation of the cold stretched film. The hot stretch roll may cooperate with a nip roll so as to provide sufficient frictional engagement. Idler rolls may be provided to achieve desired residence time in the oven and yet minimize necessary oven capacity. A second hot stretch roll may be driven by suitable driving means at a peripheral speed $S_4$, which is greater than $S_3$. The cold stretched film may thereby be hot stretched at a hot stretch ratio of $S_4/S_3$. The cold stretched-hot stretched film may be passed around idler rolls to achieve sufficient residence time for heat setting, and may then be collected on a conventional take-up roll. The take-up roll may be driven by a suitable driving means at about the same speed as the hot stretch roll so as to maintain the film in tension during heat setting.

The term "cold stretching" as used herein is defined as stretching or drawing a film to greater than its original length and at a stretching temperature, i.e., the temperature of the film being stretched, less than the temperature at which melting begins when the film is uniformly heated from a temperature of 25°C and at a rate of 20°C per minute. The term "hot stretching" as used herein is defined as stretching above the temperature at which melting begins when the film is uniformly heated from a temperature of 25°C and at a rate of 20°C per minute, but below the normal melting point of the polymer, i.e., below the temperature at which fusion occurs. As is known to those skilled in the art, the temperature at which melting begins and the fusion temperature may be determined by a standard differential thermal analyzer (DTA), or by other known apparatus which can detect thermal transitions of a polymer.

The temperature at which melting begins varies with the type of polymer, the molecular weight distribution of the polymer, and the crystalline morphology of the film. For example, polypropylene elastic film may be cold stretched at a temperature below about 120°C, preferably between about 10°C and 70°C, and conveniently at ambient temperature, e.g., 25°C. The cold stretched polypropylene film may then be hot stretched at a temperature above about 120°C and below the fusion temperature, and preferably between about 130°C and about 150°C. Again, the temperature of the film itself being stretched is referred to herein as the stretch temperature. The stretching in these two steps or stages must be consecutive, in the same direction, and in that order, i.e., cold then hot, but may be done in a continuous, semi-continuous, or batch process, as long as the cold stretched film is not allowed to shrink to any significant degree, e.g., less than 5 percent of its cold stretched length, before being hot stretched.

The sum total amount of stretching in the above two steps may be in the range of about 10 to 300 percent and preferably about 50 to 150 percent, based on the initial length of the elastic film. Further, the ratio of the amount of hot stretching to the sum total amount of stretching or drawing may be from above about 0.10:1 to below about 0.99:1, preferably from about 0.50:1 to 0.97:1, and most preferably from about 0.60:1 to 0.95:1. This relationship between the "cold" and "hot" stretching is referred to herein as the "extension ratio" (percent "hot" extension to the percent "total" extension).

In any stretching operations where heat must be supplied, the film may be heated by heat supplied by the moving rolls which may in turn be heated by an electrical resistance method, by passage over a heated plate, through a heated liquid, a heated gas, or the like.

After the above-described two stage or two step stretching, the stretched film is heat set. This heat treatment may be carried out at a temperature in the range from about 125°C up to less than fusion temperature, and preferably about 130° to 150°C, for polypropylene; from about 80°C up to less than fusion temperature, and preferably about 140° to 160°C, for acetal polymers; from about 75°C up to less than fusion temperature, and preferably about 115° to 130°C, for polyethylene, and at similar temperature ranges for other of the above mentioned polymers. This heat treatment should be carried out while the film is being held under tension, i.e., such that the film is not free to shrink or can shrink to only a controlled extent not greater than about 15 percent of its stretched length, but not so great a tension as to stretch the film more than an additional 15 percent. Preferably, the tension is such that substantially no skrinkage or stretching occurs, e.g., less than 5 percent change in stretched length.

The period of heat treatment which is preferably carried out sequentially with and after the drawing operation, should be longer than about 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon.

The distinguishing structural features of the resulting open-celled microporous films may be discerned at high magnifications, e.g., from 13,800 X to 54,000 X, from micrographs taken using the electron microscopy technique described, for example, in Geil's *Polymer Single Crystals*, page 69 (Interscience 1963). As may be seen from these micrographs, these open-celled microporous films have a plurality of elongated, non-porous, interconnecting surface regions or areas which have their axes of elongation substantially parallel to each other, and substantially normal or perpendicular to the direction in which the film is stretched or drawn according to the above-described process. Substantially alternating with and defined by the non-porous surface regions is a plurality of elongated, porous surface regions which contain a plurality of parallel fibrils. The fibrils are connected at each of their ends to the non-porous regions, and are substantially perpendicular to them. Between the fibrils are the pores of the film.

Further, these microporous films, in a tensionless state, have a bulk density lower than the density of the polymeric starting elastic material from which it is formed, which is usually no greater than 95 percent and preferably about 50 to 75 percent of the density of the elastic starting material.

The final crystallinity of the microporous film is preferably at least 30 percent, more preferably at least 40 percent, and more suitably about 50 to 100 percent, as determined by the aforementioned X-ray method.

These microporous films may also have an average pore size of 100 to 5000 Angstroms, and more usually 150 to 3000 Angstroms, the values being determined by mercury porosimetry, as described in an article by R. G. Quynn, at pages 21–34 of *Textile Research Journal*, January, 1963.

Generally, polypropylene open-celled microporous films have, at 25°C and 65 percent relative humidity, an elastic recovery from a 50 percent extension of 60 to 85 percent, a tensile strength of 20,000 to 30,000 psi, a breaking elongation of 50 to 150 percent, a modulus of 100,000 to 300,000 psi (all of the foregoing in the machine direction), and a haze of 30 percent to opaque, depending of film thickness.

The values of "recovery" or "elastic recovery" hereinbefore referred to are elastic values determined as follows at 25°C and 65 percent relative humidity:

A sample 15 millimeters in width was placed in an Instron tensile property testing machine with the jaw separation being 2 inches apart. The sample was extended at a rate of 2 inches per minute until a 50 percent extension was reached. The sample was held at that extension for 1 minute and then relaxed at the same rate as extended. A reading was recorded as soon as a no load condition was indicated by the testing machine. The elastic recovery is then calculated as follows:

tone; monohydric aliphatic alcohols such as methanol and ethanol; and aliphatic ethers such as diethyl ether and dibutyl ether.

Heptane, benzene, carbon tetrachloride, chloroform, perchloroethylene, acetone, ethanol, and diethyl ether are preferred, and perchloroethylene is most preferred.

The open-celled films are contacted with at least one of the above liquid organic compounds, and may be contacted with a mixture of two or more in desired proportions.

The open-celled films may be contacted with the liquid organic compounds in any suitable manner, e.g., by immersion, brushing, spraying or rolling techniques, in a continuous, semi-continuous, or batch method. Preferably, the open-celled film is immersed or dipped into the liquid organic compound.

Further, the open-celled film may be contacted with the liquid organic compound at any temperature and any pressure, i.e., subatmospheric, atmospheric, or superatmospheric, where the liquid organic compound remains a liquid, and where the film is not adversely degraded, and for any period of time which allows the liquid organic compound to increase the porosity of the film. Preferably, the open-celled film is contacted with the organic liquid at substantially atmospheric pressure $$\text{Elastic Recovery} = \frac{(\text{Total Length When Extended} - \text{Final Distance Between Jaws})}{\text{Length Added When Extended}} \times 100\%$$

The other properties mentioned were determined with a standard ASTM method as follows:

| | |
|---|---|
| Tensile Strength | ASTM No. D882 - Method A (Sample width 15 mm) |
| Breaking Elongation | ASTM No. D882 - Method A (Sample width 15 mm) |
| Modulus | ASTM No. D882 - Method A (Sample width 1 inch) |
| Haze | ASTM No. D1003 Procedure A |

Further, polypropylene open-celled microporous films may exhibit water vapor transmittance as high as 1600, generally 500 to 1400, the units of transmittance being given in grams/24 hours -$m^2$- atm, the method of determining transmittance being ASTM 96–63T (Procedure B).

The above described open-celled microporous films are in accordance with the present invention treated with certain liquid organic compounds to increase the porosity of the films, i.e., greater amounts of gases such as air or nitrogen or vapors such as moisture vapor are able to pass through a given size film in a given amount of time.

In general, the liquid organic compounds contemplated in the present invention have up to 8 carbon atoms and a boiling point less than 150°C.

The term "boiling point" as used herein is the normal boiling point, i.e., the boiling point at 760 mm Hg pressure.

These liquid organic compounds may be selected from aliphatic hydrocarbons such as hexane, cyclohexane, heptane, and octane; aromatic hydrocarbons such as benzene, toluene, and xylene; chlorinated aliphatic hydrocarbons such as carbon tetrachloride, chloroform, methylene chloride, methyl chloroform, vinyl trichloride, trichloroethylene and perchloroethylene; aliphatic ketones such as acetone and methyl ethyl keand at a temperature of at least 10°C, most preferably 20°C to 50°C, for about 5 seconds to 24 hours, more preferably from 30 seconds to 1 hour, and most preferably from 5 to 30 minutes.

The present invention is further illustrated by the following examples; all parts and percentages in the examples and throughout the specification and claims are by weight unless otherwise specified.

EXAMPLES I–VIII

Crystalline polypropylene having a melt index of 0.7 and a density of 0.92 was melt extruded at 230°C through an 8 inch slit die of the coat hanger type using a 1 inch extruder and a shallow metering screw. The length to diameter ratio of the extruded barrel was 24/1. The extrudate was drawndown very rapidly to a melt drawdown ratio of 150, and contacted with a rotating casting roll maintained at 50°C and 0.75 inches from the lip of the die. The non-porous elastic film produced in this fashion was found to have the following properties: thickness, 0.001 inches, recovery from 50 percent elongation at 25°C, 50.3 percent, crystallinity, 59.6 percent.

A sample of this elastic film was oven annealed in air with a slight tension at 140°C for about 30 minutes, removed from the oven and allowed to cool. It was then found to have the following properties: recovery from a 50 percent elongation at 25°C, 90.5 percent; crystallinity 68.8 percent.

4 inch by 3 and ¾ inch samples of cold stretched-hot stretched film on 1 mil caliper thickness were then produced by subjecting samples of the annealed elastic film to drawing or stretching at an extension ratio of 0.90:1 and thereafter heat setting under tension, i.e., at constant length, at 145°C for 10 minutes in air. The cold stretching portion was conducted at 25°C, the hot stretching portion was conducted at 145°C, total draw was 100 percent based on the original length of the elastic film.

4 inch by 3 and ¾ inch samples of cold stretched microporous films of 1 mil caliper thickness, were produced by cold (at 25°C) stretching a portion of the annealed elastic film described above to 100 percent of its original length and then heat setting the cold stretched film under tension, i.e., at its stretched length, for 10 minutes at about 140°C.

Similary sized samples were obtained by hot (135°C) stretching a portion of the annealed elastic film to 100 percent of its original length and heat setting under tension for 10 minutes at about 140°C.

The similarly sized samples of cold stretched-hot stretched film produced at an extension ratio of 0.90:1 as described above, were used for comparison purposes.

These samples were soaked, i.e., completely immersed, in perchloroethylene, a common dry cleaning solvent, and in various other liquid organic compounds, at 25°C for 10 minutes. The effects of this treatment with these liquid organic compounds on nitrogen flux at 25°C are summarized in TABLE I.

Nitrogen flux gives an indication of porosity, with higher nitrogen flux values indicating higher levels of porosity.

The values of nitrogen flux referred to are calculated as follows:

A film having a standard surface area of 6.5 cm$^2$ is mounted in a standard membrane cell having a standard volume of 63 cm$^3$, and the cell is pressurized to a standard differential pressure (the pressure drop across the film) of 200 psi with nitrogen. The supply of nitrogen is then closed off and the time required for the pressure to drop to a final differential pressure of 150 psi as the nitrogen permeates through the film is measured with a stop watch. The nitrogen flux, Q, in g-mol/cm$^2$min, is then determined from the equation $$Q = \frac{6.7 \times 10^1}{\Delta t \times T}$$

$\Delta t$ = elapsed time (in seconds)
T = temperature of nitrogen (in °K) which is derived from the gas law, PV = ZnRT.

25°C. There were losses or only slight gains in nitrogen flux, however, when the cold stretch process film and the hot stretch process film were treated with the same liquid organic compounds.

EXAMPLE IX

The 4 inch by 3 and ¾ inch samples of 1 mil caliper thickness cold stretch-hot stretched film (at an extrusion ratio of 0.90:1), produced in the above examples were heat sealed around the edges to polypropylene fabric. Two of these composite samples were completely immersed in perchloroethylene for 10 minutes at 25°C and about 45°C, respectively. The effects on nitrogen flux at 25°C is summarized below:

| IMMERSION TEMPERATURE | Flux*Before Treatment × 10$^3$ | Flux* After Treatment × 10$^3$ |
|---|---|---|
| 25°C | 174 | 273 |
| 45°C | 191 | 319 |

*g-mols/cm$^2$/min

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:
1. A process for increasing the porosity of an open-celled microporous polymer film having a reduced bulk density and a pore size less than 5000 Angstroms, which process comprises:
 a. forming the open-celled microporous film by
   i. cold stretching a non-porous, crystalline, elastic film of a polymer selected from the group consisting of polyolefins, polyacetals, polyamides, polyesters, polyalkylene sulfides and polyarylene oxides, at a film temperature below the temperature at which the film begins to melt, until porous surface regions perpendicular to the stretch direction are formed, the non-porous elastic film having a crystallinity of above about 20 percent, and an elastic recovery from a 50 percent strain of at least 40 percent at 25°C.,
   ii. hot stretching the resulting cold-stretched film at a film temperature in the range of between about the temperature at which the film begins to melt and the fusion temperature of the film until pore

TABLE I

EFFECT OF LIQUID ORGANIC COMPOUNDS ON NITROGEN FLUX* OF MICROPOROUS POLYPROPYLENE FILMS

| EXAMPLE | Liquid Organic Compound | 100% Cold Stretch Process | | 100% Hot Stretch Process | | Cold Stretch/Hot Stretch Process | |
|---|---|---|---|---|---|---|---|
| | | Flux Before Treatment × 10$^3$ | Flux After Treatment × 10$^3$ | Flux Before Treatment × 10$^3$ | Flux After Treatment × 10$^3$ | Flux Before Treatment × 10$^3$ | Flux After Treatment × 10$^3$ |
| I | Perchloroethylene | 46.65 | 45.54 | 39.85 | 12.40 | 174 | 319 |
| II | Carbon Tetrachloride | 41.58 | 39.04 | 66.00 | 59.78 | 191 | 319 |
| III | Acetone | 47.82 | 46.65 | 31.88 | 26.20 | 174 | 273 |
| IV | Heptane | 33.56 | 36.78 | 59.78 | 57.76 | 174 | 273 |
| V | Benzene | 23.91 | 25.17 | 46.65 | 31.88 | 160 | 191 |
| VI | Ethanol | 24.84 | 24.21 | — | — | 174 | 191 |
| VII | Diethyl Ether | 14.82 | 15.18 | 4.03 | 4.36 | 174 | 273 |
| VIII | Chloroform | 11.25 | 5.43 | — | — | 160 | 273 |

*g-mols/cm$^2$/min

As can be seen from TABLE I, treatment of an open-celled microporous polypropylene film prepared by the cold stretch/hot stretch process with liquid organic compounds such as perchloroethylene caused a dramatic increase, e.g., over 45 percent, in the porosity of the film as measured by the increase in nitrogen flux at spaces elongated parallel to the stretch direction are formed, said cold and hot stretching steps conducted at an extension ratio between 0.10:1 and 0.99:1 to a total stretch of 10 to 300 percent of the original length of the elastic film, iii. and therafter heating the resulting microporous film under tension; and b. contacting the open-celled microporous film with a liquid organic compound at 10°C. or above whereby the porosity is increased, the liquid organic compound having a normal boiling point less than 150°C. and selected from the group consisting of aliphatic and aromatic hydrocarbons, chlorinated aliphatic hydrocarbons, aliphatic ketones, monohydric aliphatic alcohols and aliphatic ethers, the members of the group having up to 1 carbon atoms.

2. The process of claim 1 wherein the liquid organic compound is selected from the group consisting of carbon tetrachloride, perchloroethylene, acetone, heptane, benzene, ethanol, diethyl ether and chloroform.

3. The process of claim 2 wherein the film is a polypropylene film and wherein the liquid organic compound is perchloroethylene.

4. A process for increasing the porosity of an open-celled microporous polypropylene film having a reduced bulk density compared to the bulk density of corresponding polypropylene film having no open-celled structure, and a pore size less than 5000 Angstroms, which process comprises a. forming the open-celled film by
 i. cold stretching at a temperature between 10°C and 70°C a non-porous, crystalline, elastic polypropylene film to develop porous surface regions perpendicular to the stretch direction, the elastic polypropylene film having an initial crystallinity of at least 30 percent, and an initial elastic recovery from a 50 percent strain of at least 50 percent at 25°C,
 ii. hot stretching the resulting unrelaxed cold stretched film at a temperature between 130°C and 150°C to a total stretch of 10 to 300 percent of the original length of the elastic film and at an extension ratio between 0.50:1 and 0.97:1 to develop pore spaces elongated parallel to the stretch direction, the cold stretching and the hot stretching being conducted in the same stretch direction, and
 iii. thereafter heating the resulting microporous film at substantially constant length at a temperature between about 130°C and 150°C; and b. immersing the open-celled film in a liquid organic compound at a temperature of from 20°C to 50°C for about 30 seconds to 1 hour, the liquid organic compound selected from the group consisting of carbon tetrachloride, perchloroethylene, acetone, heptane, benzene, ethanol, diethyl ether and chloroform.

5. A process for increasing the porosity of an open-celled microporous polypropylene film having a reduced bulk density compared to the bulk density of corresponding polymer films having no open-celled structure and a pore size less than 5000 Angstroms, which process comprises:

a. forming the open-celled film by
 i. melt extruding a film-forming polypropylene;
 ii. taking up the extruded film at a drawdown ratio between 20:1 and 200:1;
 iii. cold stretching the as-extruded film at a temperature below about 120°C;
 iv. hot stretching the resulting cold-stretched film at an extension ratio between about 0.50:1 and 0.97:1 to a total stretch of 10 to 300 percent of its as-extruded length and at a temperature above 120°C and below the fusion temperature,
 v. and thereafter heating the resulting stretched film at substantially constant length and at a temperature between 130°C and 150°C; and b. contacting the open-celled microporous film with a liquid organic compound whereby the porosity is increased, the liquid organic compound having a normal boiling point less than 150°C and selected from the group consisting of aliphatic and aromatic hydrocarbons, chlorinated aliphatic hydrocarbons, aliphatic ketones, monohydric aliphatic alcohols, and aliphatic ethers, the members of the group having up to 8 carbon atoms.

6. A process for increasing the porosity of an open-celled microporous polypropylene film having a reduced bulk density compared to the bulk density of corresponding polymer films having no open-celled structure, and a pore size less than 5000 Angstroms, which process comprises:

a. forming the open-celled film by
 i. melt extruding at a temperature between 200°C and 240°C a film-forming isotactic polypropylene having a molecular weight of from 200,000 to 500,000 and a melt index of from 0.5 to 30;
 ii. taking up the extruded film at a drawdown ratio between 50:1 and 150:1;
 iii. heating the as-extruded film at a temperature between 100°C and 155°C for about 5 seconds to 24 hours to improve the crystal structure of the film,
 iv. cold stretching the resulting film at a temperature between 10°C and 70°C;
 v. hot stretching the resulting cold-stretched film at a temperature between 130°C and 150°C, wherein the cold stretching and hot stretching are conducted at an extension ratio between about 0.60:1 and 0.95:1, and wherein the film is subjected to a total stretch of 50 to 150 percent of its as-extruded length; and
 vi. heating the resulting stretched film at substantially constant length and at a temperature between 130°C and 150°C; and b. immersing the open-celled film in a liquid organic compound at a temperature of from 20°C to 50°C for about 5 to 30 minutes, the liquid organic compound selected from the group consisting of carbon tetrachloride, perchloroethylene, acetone, heptane, benzene, ethanol, diethyl ether and chloroform.

* * * * *